United States Patent
Szladovics et al.

(10) Patent No.: US 7,340,718 B2
(45) Date of Patent: Mar. 4, 2008

(54) UNIFIED RENDERING

(75) Inventors: Andras Szladovics, Budapest (HU); Rolf Krane, Wiesloch (DE); Reiner Hammerich, Rauenberg (DE); Martin Schaus, Karlsruhe (DE); Brian Craig McKellar, Heidelberg (DE); Thorsten Dencker, Ludwigshafen (DE); Werner Baechle, Heidelberg (DE); Andreas Roessler, Sulzfeld (DE); Josef Dietl, Nussloch (DE); Peer Hilgers, St. Leon-Rot (DE)

(73) Assignee: SAP AG, Walldorf (DE)

( * ) Notice: Subject to any disclaimer, the term of this patent is extended or adjusted under 35 U.S.C. 154(b) by 697 days.

(21) Appl. No.: 10/435,276

(22) Filed: May 8, 2003

(65) Prior Publication Data

US 2004/0223009 A1 Nov. 11, 2004

Related U.S. Application Data

(60) Provisional application No. 60/415,116, filed on Sep. 30, 2002.

(51) Int. Cl.
*G06F 9/45* (2006.01)
(52) U.S. Cl. .................................................. 717/106
(58) Field of Classification Search ............... 717/106, 717/136
See application file for complete search history.

(56) References Cited

U.S. PATENT DOCUMENTS

| | | | |
|---|---|---|---|
| 5,987,256 A * | 11/1999 | Wu et al. ................... | 717/146 |
| 6,091,422 A * | 7/2000 | Ouaknine et al. ........... | 345/419 |
| 6,504,554 B1 * | 1/2003 | Stone et al. ................. | 715/760 |
| 6,904,566 B2 * | 6/2005 | Feller et al. ................. | 715/728 |
| 2003/0076345 A1 * | 4/2003 | Feller et al. ................. | 345/716 |
| 2003/0225829 A1 * | 12/2003 | Pena et al. ................... | 709/203 |

OTHER PUBLICATIONS

Abrams, Mark, et al., "UIML: An XML Language for Building Device-Independent User Interfaces," Dec. 1999, retrieved from the Internet on May 17, 2004, at http://www.harmonia.com/resources/papers/xml99Final.pdf, XP002280477, 15 pgs.

Abrams, Marc, et al., "User Interface Markup Language (UIML) Specification, Version 3.0," Feb. 8, 2002, retrieved from the Internet on May 18, 2002, at http://www.uiml.org/specs/docs/uiml30-revised02-12-02.pdf, XP002280679, 116 pgs.

(Continued)

*Primary Examiner*—John Chavis
(74) *Attorney, Agent, or Firm*—Finnegan Henderson Farabow Garrett & Dunner LLP

(57) ABSTRACT

Systems, methods, and apparatus, including computer program products, for abstracting rendering logic and automatically generating platform-specific renderers from the abstracted rendering logic for multiple platforms. A platform-independent description of rendering logic for a control is specified. The platform-independent description is used to generate a platform-specific renderer for the control. The platform-specific renderer is operable to be executed on a specific platform to produce code that can be used in rendering the control on a client computer. Some implementations enable code for platform-specific renderers to be generated automatically based on centrally defined rendering logic. Rendering logic can thus be modified once and used to automatically update code and libraries for platform-specific renderers on multiple platforms.

78 Claims, 7 Drawing Sheets

OTHER PUBLICATIONS

Ali, Mir Farooq, et al., "Building Multi-Platform User Interfaces with UML," Nov. 9, 2001, retrieved from the Internet on May 17, 2004, at http://arxiv.org/ftp/cs/papers/0111/0111024.pdf, XP002280476, XP002280477, XP002280490, 12 pgs.

"Computer Science, abstract," Arxiv.org E-Print Archive, retrieved from the Internet on May 17, 2004, at http://arxiv.org/abs/cs.HC/0111024, XP002280478, 1 pg.

Kagle, Kurt, et al., "Professional XSL," 2001, Wrox Press Ltd., Arden House, Birmingham, UK, XP002281359, p. 742.

Levine, John R., "Linkers & Loaders," 2000, Morgan Kaufmann Publishers, San Francisco, CA, XP002283283, p. 48.

Phanouriou, Constantinos, "UIML: A Device-Independent User Interface Markup Language," Virginia Polytechnic Institute and State University, Sep. 26, 2000, retrieved from the Internet on May 17, 2004, at http://scholar.lib.vt.edu/theses/available/etd-08122000-19510051/unrestricted/PhanouriouETD.pdf, XP002280491, 172 pgs.

Phanouriou, Constantinos, "User Interface Markup Language (UIML) Draft Specification, Version 2.0a," Jan. 17, 2000, retrieved from the Internet on May 17, 2004, at http://www.uiml.org/specs/docs/uiml20-17Jan00.pdf, XP002280490, 64 pgs.

* cited by examiner

UNIFIED RENDERING

CROSS-REFERENCE TO RELATED APPLICATION

This application claims priority to U.S. Provisional Application 60/415,116, entitled "Unified Rendering," which was filed on Sep. 30, 2002.

BACKGROUND

The present specification relates to data processing, and more particularly to client-server applications.

Client-server applications typically have two components: a server or back-end component that provides the application logic, and a client or front-end component through which a user interacts with the application. The server component, which is sometimes referred to simply as the application itself, is usually executed on a computer that is specifically configured as a server. The server computer may have resources that provide high computational and network bandwidth, for example, so that it can execute multiple applications that interact with numerous clients. The client component can be executed on a separate computer, although in some instances the server component and the client component may be executed on the same computer. In this specification, a program is said to be executed whether the program is compiled or interpreted.

Server computers typically provide a specific platform that can be used to execute applications written in a corresponding language. For example, a server computer may be configured to provide a Java 2, Enterprise Edition (J2EE) platform that can be used to execute Java applications. Other examples of platforms include Microsoft's .NET platform, which can be used to execute applications written in C#, and SAP's Advanced Business Application Programming Language (ABAP) platform, which can be used to execute ABAP applications.

Platforms generally provide a framework within which applications execute. Among other things, a framework provides controls, which are elements through which a user interacts with, provides input to, or controls an application. For example, a control can be a button that allows a user to activate a certain feature, a radio button that allows the user to select one of several choices, a textbox that allows the user to enter some input, or a checkbox that allows the user to select or de-select an option.

The framework provided on a specific platform usually includes variables or objects to store the server side state of controls, control logic that specifies how the controls operate, and rendering logic that specifies how the controls should be rendered on the client component of an application. The control logic for a checkbox, for example, can specify that the value of a variable that represents the checkbox should toggle between "true" and "false" as the user clicks on the checkbox. The rendering logic for the checkbox, on the other hand, can specify that the checkbox should be rendered as an empty square or as a square with a checkmark in it depending on the state of the corresponding variable. Rendering logic is often provided in the form of a function or a class of functions that convert the state of a control into code that can be used to render the control on a client component. For example, rendering logic can produce markup language such as Hypertext Markup Language (HTML) code for rendering a control on a client browser, or Wireless Markup Language (WML) code for rendering the control on a wireless client interface.

Although applications are usually written in one language and executed on one platform, they are frequently ported into multiple languages and executed on multiple platforms. Such porting can make applications available to more customers, but it can also create additional maintenance work. One example of such maintenance work occurs when a company decides to change the "look" of its applications. For instance, a company can decide that when a checkbox is selected, the corresponding text for the checkbox should always be rendered in boldface font. In such a scenario, the company would have to modify the appropriate control rendering logic for every platform and framework on which its applications execute.

SUMMARY

The present invention addresses the problem of having to modify, re-write, or port rendering logic multiple times by abstracting rendering logic and automatically generating a platform-specific renderer from the abstracted rendering logic for each platform.

In one aspect, the invention features a system including a platform, a platform-independent description of rendering logic for a control, and a platform-specific renderer for the control. The platform-specific renderer is operable to be executed on the platform, and is generated automatically from the platform-independent description.

Advantageous implementations can include one or more of the following features. The platform-independent description can include an interface for the control. The interface can have a parameter, and the platform-independent description can be based on the parameter. The platform-independent description can include a comparison of the parameter and a value, and a branching instruction that is based on the result of the comparison. The comparison and the branching instruction can be included in a loop. The platform-independent description can include a logical expression that is a function of the parameter, and a branching instruction that is based on the result of the logical expression.

The platform-specific renderer can be operable to produce code to be used in rendering the control. The platform-independent description can include an attribute that is to be included in the code. The attribute may be fixed. The platform-independent description can include a mapping from the parameter to the attribute.

The platform-independent description can include a control logic interface for the control. The control logic interface can have a property that represents the state of the control. The platform-independent description can include a mapping from the property to the parameter.

The platform-specific renderer can be operable to produce code to be used in rendering the control on a client computer, and the interface can include an indication of a function that can be executed on the client computer. The function can be a JavaScript function.

The platform-specific renderer can be operable to produce code to be used in rendering the control. The code may include a command, a method, or markup code.

Markup code may have statements in an SGML-based markup language. The platform-independent description can have a tag to be included in the markup code. The markup code can include HTML code, XML (Extensible Markup Language) code, WML code, or SVG (Scalable Vector Graphics) code, and the tag can be an HTML, XML, WML, or SVG tag.

The platform-specific renderer can be operable to produce code to be used by a Graphical User Interface (GUI) engine in rendering the control. The GUI engine can be web-based. The GUI engine can also be based on an operating system. The GUI engine can include an application, such as a browser. The GUI engine can also include an SVG engine, a graphical subsystem of an operating system, or a graphics card.

The platform-independent description can include a named event and an indication of a function to be invoked when the named event occurs. The function indication can include a function type.

The platform-specific renderer can be operable to produce code to be used by a program on a client computer, and the platform-independent description can include an indication of a client program for which the code is suitable. The indication of the client program can include a version number for the program.

The platform-independent description can be specified in a meta-language. The meta-language, which can have validation capabilities, can be XML.

The platform-specific renderer can include a function or a class library.

The platform-independent description can include a first fragment and a second fragment of rendering logic. The first fragment can include an instruction that calls the second fragment. The second fragment can be nested within the first fragment.

In another aspect, the invention features a system including a platform, a first platform-independent description of rendering logic for a control, a second platform-independent description of rendering logic for the control, a first platform-dependent renderer for the control, and a second platform-dependent renderer for the control. The first platform-independent description includes a fragment of rendering logic. The second platform-independent description includes an indication to use the fragment from the first platform-independent description. The first platform-dependent renderer is operable to be executed on the platform, and is generated automatically based on the first platform-independent description. The second platform-independent renderer is also operable to be executed on the platform, and is generated automatically based on the fragment and the second platform-independent description.

In another aspect, the invention features a system including a platform, a platform-independent description of rendering logic for a control, a platform-specific renderer for the control, a first class library, and a second class library. The platform-specific renderer is operable to be executed on the platform, and is generated automatically based on the platform-independent description. The first class library is operable to produce code for rendering a set of controls on a first device, and includes the platform-specific renderer. The second class library is operable to produce code for rendering the set of controls on a second device that has substantially all the features of the first device. The second class library is hierarchically arranged to inherit properties from the first class library.

Advantageous implementations can include one or more of the following features. The second class library can include a link to the platform-specific renderer in the first class library. The second class library can include a copy of the platform-specific renderer in the first class library.

In another aspect, the invention features a system including a plurality of platforms, a plurality of platform-independent descriptions of rendering logic for a control, and a plurality of platform-specific renderers for the control. Each platform-independent description corresponds to a device on which the control is to be rendered. Each platform-specific renderer is generated automatically based on one of the plurality of platform-independent descriptions. Each platform-specific renderer is operable to be executed on one of the plurality of platforms to produce code for rendering the control on the device that corresponds to the platform-independent description on which the platform-specific renderer is based.

In another aspect, the invention features a method that includes receiving a platform-independent description of rendering logic for a control, and generating a first platform-specific renderer for the control based on the platform-independent description. The first platform-specific renderer is operable to be executed on a platform of a first kind to produce code that can be used in rendering the control.

Advantageous implementations can include one or more of the following features. The method can include generating a second platform-specific renderer for the control based on the platform-independent description. The second platform-specific renderer can be operable to be executed on a platform of a distinct, second kind to produce code that can be used in rendering the control.

The platform-independent description can include an XML file, and an XSLT (Extensible Stylesheet Language Transformations) processor can be used to generate the first platform-specific renderer. The first platform-specific renderer can include a function or a class library.

In another aspect, the invention features a method that includes receiving at least one platform-independent description of rendering logic for a control, and generating at least two platform-specific renderers for the control based on the at least one platform-independent description. Each platform-specific renderer is operable to be executed on a platform to produce code that can be used in rendering the control. Information about a device on which the control is to be rendered is received. One of the platform-specific renderers is selected to produce code to be used in rendering the control based on the information about the device. In one implementation, the information about the device can include a Hypertext Transfer Protocol (HTTP) user-agent string.

In another aspect, the invention features a method that includes receiving a first and a second platform-independent description of rendering logic for a control. The first platform-independent description corresponds to a first device on which the control is to be rendered, and includes a fragment. The second platform-independent description corresponds to a second device on which the control is to be rendered, and includes an indication to use the fragment from the first platform-independent description. A first platform-specific renderer is generated for the control based on the first platform-independent description. The first platform-specific renderer is operable to be executed on a platform to produce code that can be used in rendering the control on the first device. A second platform-specific renderer is generated for the control based on the fragment and the second platform-independent description. The second platform-specific renderer is operable to be executed on the platform to produce code that can be used in rendering the control on the second device.

In another aspect, the invention features a method that includes receiving a platform-independent description of rendering logic for a control, and generating a platform specific renderer for the control based on the platform-independent description. The platform-independent description corresponds to a first device on which the control is to be rendered. A first class library for rendering a set of controls on the first device is generated. The first class library includes the platform-specific renderer. A second class library for rendering the set of controls on a second device is generated. The second class library includes a link to the platform-specific renderer in the first class library. In one implementation, the link can arise by virtue of a hierarchical relationship between the first class library and the second class library.

In another aspect, the invention features a computer-readable template for generating a platform-specific renderer for a control. The template includes an interface for the control, and rendering logic that specifies in a platform-independent way code to be used in rendering the control. The code is based on a parameter included in the interface.

Advantageous implementations can include one or more of the following features. The rendering logic can be transformable by automatic process to platform-specific logic that can be executed on a specific platform to generate the code. The template can include a control logic interface with a property that represents the state of the control. The rendering logic can include a mapping from the property to the parameter. The rendering logic can include a first fragment and a second fragment. The template can be specified in a meta-language. The meta-language can be XML. The code can include a command, a method, or markup code. The markup code can have statements in an SGML-based markup language (e.g., HTML or SVG). The code can be used as input to a GUI engine. The GUI engine can include a browser, an SVG engine, or a graphical subsystem of an operating system.

These general and specific aspects can be implemented using a system, a method, a computer program, or any combination of systems, methods, and computer program products.

The invention can be implemented to realize one or more of the following advantages. The invention can be used to separate control logic from rendering logic, so that rendering logic can be defined and modified separately from control logic and application logic. Rendering logic can be unified and centralized. Rendering logic can thus be modified more easily and on a schedule that is not tied to the development of controls or applications. Designers can modify rendering logic and control developers can modify control logic independently of each other and possibly using different release cycles.

Code for platform-specific renderers can be generated automatically based on centrally defined rendering logic. Rendering logic can be modified once and used to automatically update code and libraries for platform-specific renderers on disparate platforms. Applications can thus be given a consistent appearance or "look and feel" across multiple platforms and frameworks. Graphic designers or even customers who have purchased an application or a suite of applications can use the invention to easily modify the way the applications are rendered. One implementation of the invention provides all of the above advantages.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
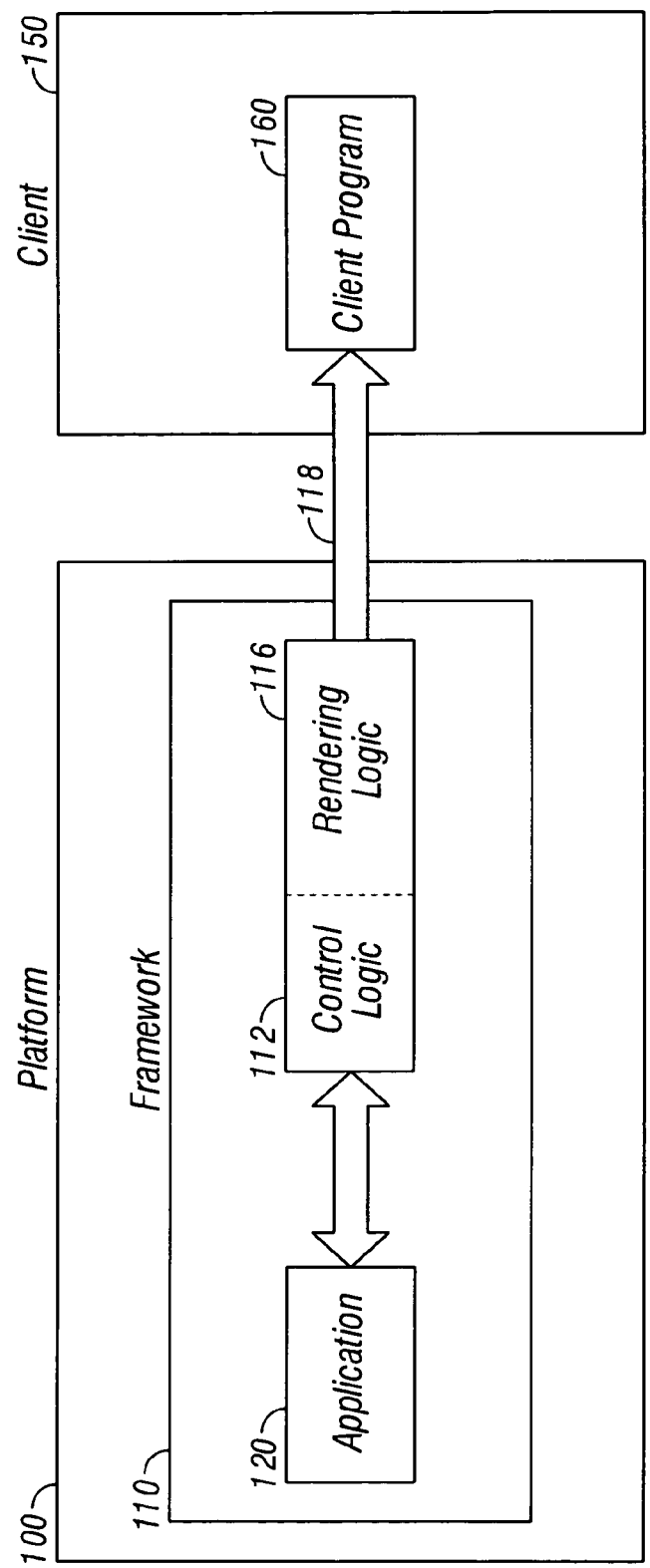
FIG. 1 is a block diagram of a conventional platform.

FIG. 1 depicts a conventional platform 100 for executing an application 120. The platform 100 may be, for example, a Java platform that can be used to execute a Java application. The platform 100 provides a framework 110 that includes controls, which are elements through which a user interacts with, provides input to, or controls applications. Examples of controls include buttons, radio buttons, checkboxes, and text boxes.

The framework 110 includes control logic 112, which specifies how controls operate, and rendering logic 116, which specifies how controls are to be rendered by a client. The control logic 112 is usually intermixed with the rendering logic 116. For example, when a user clicks on a checkbox, the framework 110 can invoke code that specifies that the value of the variable that represents the checkbox should toggle between "true" and "false," and that the checkbox should be rendered as either a square with a checkmark in it or an empty square, depending on the value of the corresponding variable.

The application 120 contains application logic, which specifies what substantive functions are to be performed based on user input and other input data. The application 120 interacts with the controls provided by the framework 110 to produce code 118 that can be used to render a user interface on a client computer 150. For example, the rendering logic 116, which can be referred to as a renderer, can produce HTML code that can be rendered by a client program 160 (e.g., a browser) running on a client computer 150. In the case of a control that is a checkbox, for example, the renderer 116 can produce HTML code that specifies that the browser should draw a square (either with or without a checkmark, as the case may be), as well as some corresponding text for the checkbox in a certain font and in a certain position within the browser window.

Client program 160 can be any Graphical User Interface (GUI) engine. A GUI engine is any system (including software or hardware) that can be used to render a user interface. For example, client program 160 can be a web-based GUI engine, such as a browser or a browser plug-in. Client program 160 can also be an application or other GUI engine based on a particular operating system, such as Microsoft Windows. An example of an operating system-based client program 160 is a Scalable Vector Graphics (SVG) engine for Microsoft Windows. Client program 160 can also be a graphics system, such as a graphics card in the client computer 150, or the graphical subsystem of the operating system running on the client computer 150.

The code 118 can include markup code that can be used as input to a GUI engine. For example, the code 118 can include HTML code, WML code, XML code, SVG code, or code in any SGML-based markup language. The code 118 can also include commands, methods, or functions for rendering a user interface on the client computer 150. The commands, methods, or functions can be interpreted and executed by client program 160. The particular type of code 118 that is produced can depend on the types of the client computer 150 and the client program 160.

Figure 2:
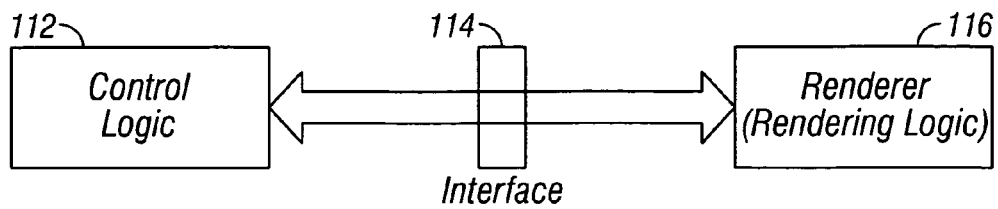
FIG. 2 is a block diagram of a renderer and an interface in accordance with one embodiment of the invention.

The systems and techniques described herein can be used to separate the control logic 112 from the rendering logic 116, as shown conceptually in FIG. 2. The control logic 112 for a control interacts with the control's rendering logic 116 through an interface 114, an example of which is shown below in pseudo-code. The control's interface 114 contains a set of parameters that the control logic 112 can set or manipulate in order to affect how the control is rendered. The control logic 112 can set the values of the parameters specified in the interface 114 based on the state of the control. That is, the control logic 112 can map the state of the control into values to be assigned to the parameters; the rendering logic 116 can then produce code to be used in rendering the control based on the values assigned to the parameters.

```
<interface control="Group"
xmlns:html="http://www.w3.org/1999/xhtml" skin="Design2002">
    <parameter name="Design" type="GroupDesign/>
    <fragments>
        <fragment name="Caption" description="">
            <parameter name="Title" type="string"/>
        </fragment>
        <fragment name="ContentArea" description=""/>
        <fragment name="Toolbar" description=""/>
    </fragments>
    <enumeration name="GroupDesign">
        <value>PrimaryGroupBox"</value>
        <value>SecondaryGroupBox"</value>
        <value>TransparentGroup"</value>
    </enumeration>
</interface>
```

The example above specifies an interface 114 for a control called a Group. A Group control is a grouping of other controls. For example, a Group control can be used to group several related controls, such as buttons that specify whether text input is to be underlined, boldfaced, or italicized. In this example, the button controls are grouped together as part of the Group control, and they can be considered children of the Group control.

The interface 114 lists one parameter for the Group control—a parameter named Design, whose type is Group-Design. As specified at the end of the pseudo-code, Group-Design is an enumerated type that can have the values PrimaryGroupBox, SecondaryGroupBox, and Transparent-Group. In essence, that means there can be three types of Group controls, and how each instance of a Group control is rendered will depend on the type of that particular instance (i.e., on the value of the Design parameter for that particular instance). In some implementations, enumerations can be specified in separate files.

The interface 114 further specifies that a Group control contains three fragments—a Caption, a ContentArea, and a Toolbar. Fragments are segments of rendering logic that can be re-used. For example, a button control can be defined in a fragment that can be used repeatedly as part of a larger toolbar control. Fragments can call each other, either unconditionally, or conditionally based on the value of a parameter or the evaluation of a logical expression. Fragments can also be nested within each other.

Fragments can have parameters through which data or information can be passed to the rendering logic in the fragment in order to affect the rendering code that is produced by the fragment. For example, in the pseudo-code listed above, the Caption fragment takes one parameter whose name is Title and whose type is string. The type of a parameter indicates the type of values the parameter can have. In the example above, the Title parameter can be assigned a string, such as "Title for the Screen Section in which the Group will be Drawn."

A renderer 116 must ultimately produce code that can be used by a client program 160, e.g., a browser, in rendering a control. The browser may be able to render code such as HTML code. In such an implementation, the renderer 116 has to take the parameters specified in the control interface 114, and, based on the value of those parameters, produce HTML code that can be rendered by the browser. For example, the browser may be able to render code such as "title="ABC"". In such a case, the renderer 116 may output the HTML code "title="", followed by the value of the Title parameter, followed by a closing quotation mark """.

After a control's interface 114 has been defined, an abstract renderer is created for the control. An abstract renderer contains platform-independent rendering logic that defines how the control will be rendered based on the value of the parameters in the control's interface 114. As explained above, a renderer 116 must ultimately produce code that can be used by a client program in rendering a control. The produced code can contain various attributes (e.g., "title"). The rendering logic in an abstract renderer can set the value of such attributes based on the value of the parameters in the interface 114 and on rendering logic, as explained in more detail below.

An abstract renderer provides an abstract, platform-independent description of how a control is to be rendered. The abstract rendering logic in an abstract renderer can be thought of as a template that can be translated or mapped into concrete rendering logic—e.g., a renderer 116—comprised of functions, libraries, or other code that can be executed on a platform to produce code for rendering a control.

An abstract renderer can be written in any language, provided there is a mechanism for translating the abstract rendering descriptions in that language into platform-specific code that can be executed (or compiled and then executed) to produce code for rendering a control. An abstract renderer can also be written in a meta-language. For example, the abstract renderer below is written in Extensible Markup Language (XML). A meta-language can in essence define a new language for describing an abstract renderer. In the example below, the XML code describes an abstract renderer for a Group control using fragment, device, attribute, switch, case, and html elements; those elements in essence define a new language for describing an abstract renderer.

If the language used to describe an abstract renderer has validation capabilities, such capabilities can be used to verify that the abstract renderer is structured correctly (e.g., that the abstract renderer has the proper syntax and grammar). For example, a Document Type Definition (DTD) can be used to validate an abstract renderer written in XML.

```
<renderer control="Group"
    xmlns:html="http://www.w3.org/1999/xhtml"
    skin="Design2002">
    <device>IE5</device>
    <fragment name="GroupFragment">
        <html:table border="0" cellspacing="0"
cellpadding="0">
            <html:tr>
                <html:td>
                    <attribute name="class">
                        <switch parameter="$Design">
                            <case
value="PrimaryGroupBox">PrimaryGroupBoxWhl</case>
                            <case
value="SecondaryGroupBox">SecondaryGroupBoxWhl</case>
                            <case
value="TransparentGroup">TransparentGroupWhl</case>
                        </switch>
                    </attribute>
                </html:td>
            </html:tr>
            <attribute name="width" value="$Width"/>
            <html:tr>
                <html:td>
                    <render content="$Content"
descriptor="Group.Content"/>
                </html:td>
            </html:tr>
        </html:table>
    </fragment>
    <fragment name="Caption" description="">
        <attribute name="title" value="$Title"/>
        // ... more rendering logic ...
    </fragment>
    // ... more fragments ...
</renderer>
```

The example above shows an abstract renderer for a control called a "Group." The rendering logic specified in the abstract renderer can contain various statements, which may be grouped together into one or more fragments. The rendering logic can specify, for example, that the renderer should output hard-coded statements with hard-coded attributes, such as "<html:table border="0" cellspacing="0" cellpadding="0">. A platform-specific renderer generated from such an abstract renderer would output the HTML "<table>" tag, and would set the "border," "cellspacing," and "cellpadding" attributes in the tag to "0."

The rendering logic can also specify that a specific attribute should be mapped to the corresponding value for a parameter (e.g., the attributes "width" and "title" above are mapped to the parameters "Width" and "Title," respectively). In the implementation above, fragments can access parameters by prepending parameter names with the "$" symbol. For example, the GroupFragment fragment can access the parameter "Width" through the expression "$Width". Predefined parameters may be available in some implementation. For example, in one implementation, the parameter "$system" can be used to provide access to framework services.

Examples of elements that can be used to define abstract rendering logic—e.g., the <device>, <switch>, and <attribute> elements in the renderer above—are provided and explained in more detail below.

Rendering logic can also contain logical expressions based on parameters, and branching statements such as if-then statements or switch statements to execute different sections of code in the renderer based on the outcome of (or comparisons between) logical expressions. In the sample renderer above, a switch statement is used to generate different rendering code based on the value of the parameter Design. The interface for the Group control specifies that the control includes a parameter named Design that is of type GroupDesign. The interface also specifies that GroupDesign is an enumerated type that may have the value PrimaryGroupBox, SecondaryGroupBox, and TransparentGroupBox. As shown above, the abstract renderer may contain rendering logic that generates different rendering code based on the value of the Design parameter. Rendering logic can also set or adjust generic and specific attributes, and output specific rendering code such as HTML tags, based on parameter settings.

An abstract renderer can also contain a placeholder for content that is to be rendered as part of the control, as shown by the "<render content="$Content" . . . />" statement in the example above. The <render> element, which is actually a call to the framework to render the indicated content, can also be used to render another control or a collection of controls. For example, if a Group control includes a number of children controls (e.g., a number of button controls that make up the Group control), a <render> statement can be used to generate rendering code for the children controls. This is explained in more detail below.

As shown above and as explained previously, rendering logic can be divided into reusable segments called fragments. Fragments can call each other, either unconditionally, or conditionally based on the value of a parameter or the evaluation of a logical expression. Fragments can also be nested within each other. A <call-fragment> element can be used to call another fragment; an example of such an element is provided further below.

Figure 3:
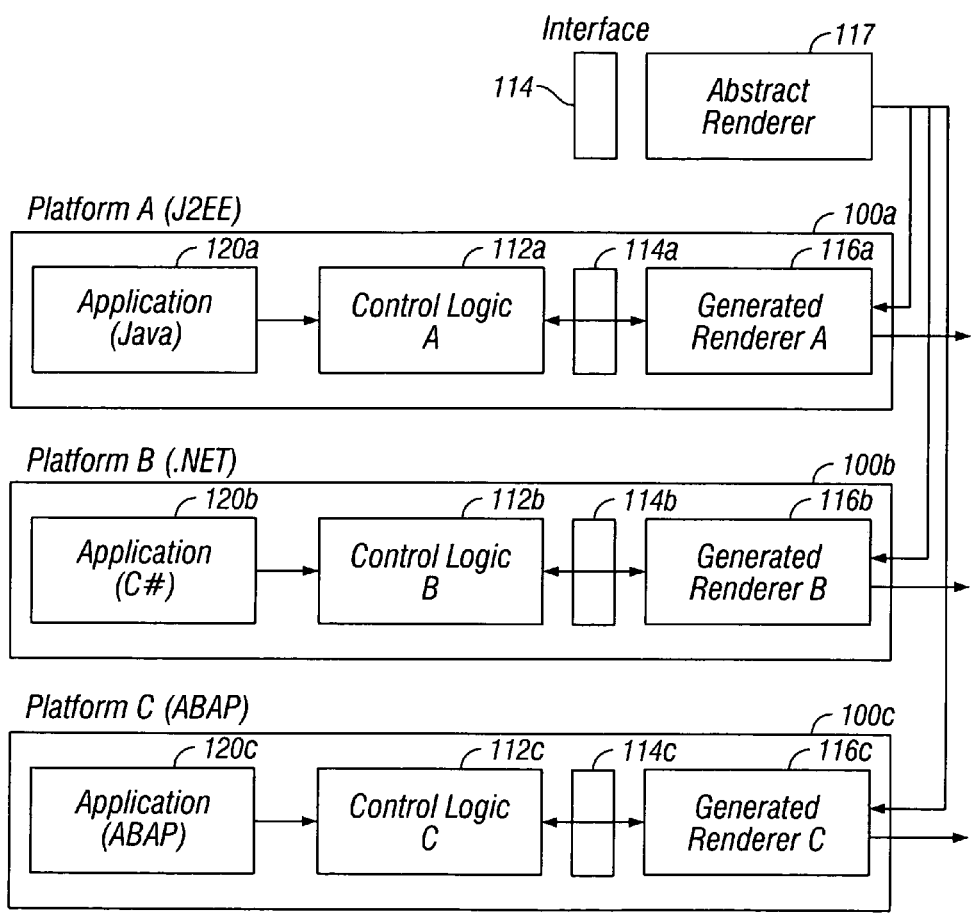
FIG. 3 is a block diagram of an abstract renderer and three platform-specific renderers in accordance with one embodiment of the invention.

Once an abstract renderer has been created, it can be used to generate a platform-specific renderer for one or more platforms, as shown conceptually in FIG. 3. The abstract renderer thus serves as a template from which multiple platform-specific renderers can be generated. In the example in FIG. 3, the abstract renderer 117 is used to generate three platform-specific renderers 116a, 116b, 116c —one for a J2EE platform 100a, one for a .NET platform 100b and one for an ABAP platform 100c respectively. FIG. 3 depicts an application with three versions 120a, 120b, 120c each designed to run on a specific platform. Each application version 120a, 120b, 120c interacts with the control logic 112a, 112b,112c provided by the corresponding platform framework in which the application version runs to set or assign values to the parameters specified in the corresponding control interface 114a, 114b, 114c. Each platform-specific renderer 116a, 116b, 116c then produces code that can be used to render the application's user interface based on the value of the parameters.

Figure 4:
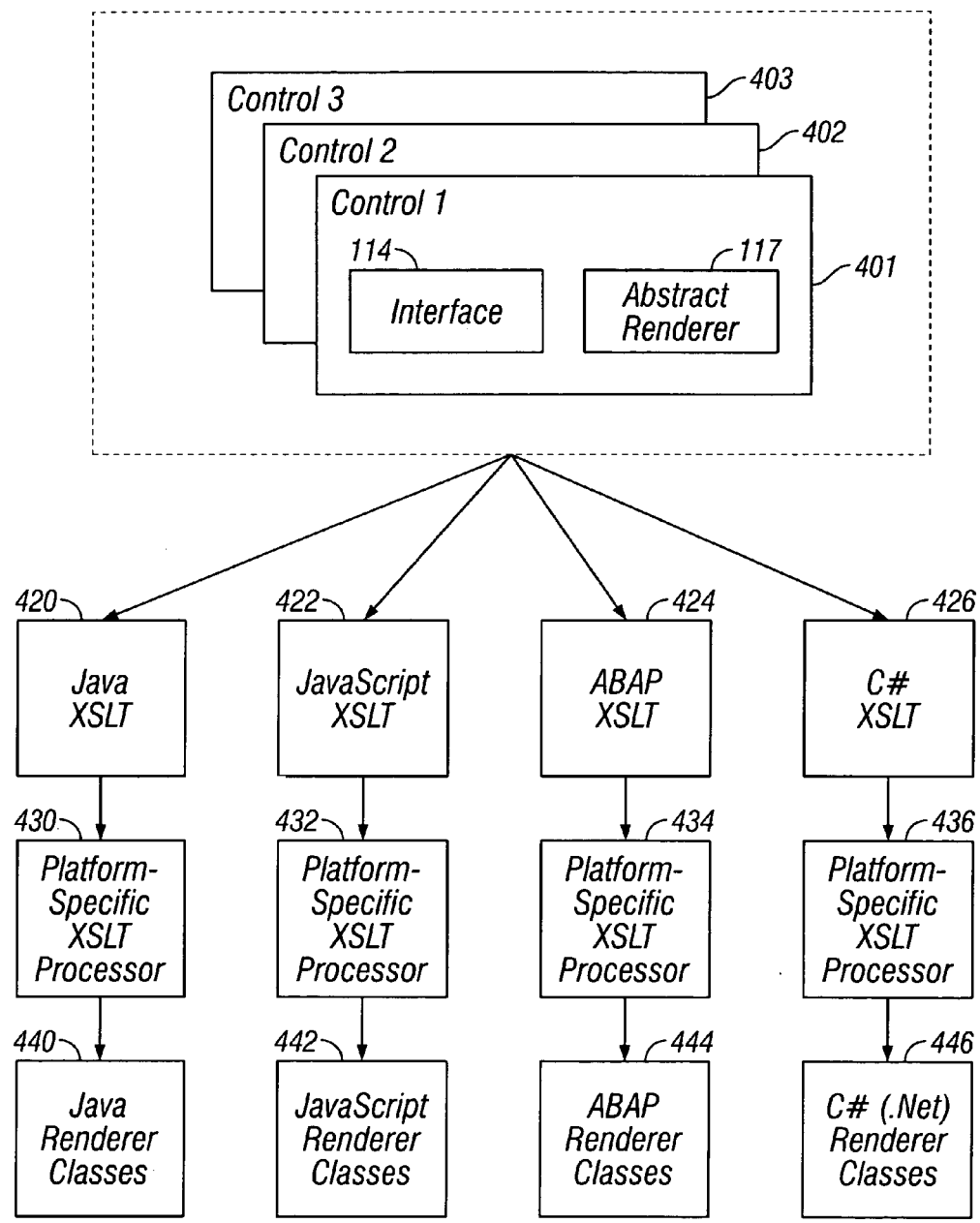
FIG. 4 is a block diagram of platform-specific renderers for multiple controls in accordance with one embodiment of the invention.

FIG. 4 depicts the generation of multiple platform-specific renderers for multiple controls. There are three controls 401, 402, 403 shown in the example in FIG. 4. Each control has an interface 114 and an abstract renderer 117, both of which can be defined, for example, in XML. The abstract renderer 117 and the corresponding interface 114 for each control can be used to generate one or more platform-specific renderers for that control. In the example in FIG. 4, the abstract renderer for each control is used to generate four platform-specific renderers for that control—a Java renderer, a JavaScript renderer, an ABAP renderer, and a .Net renderer. Each platform-specific renderer can be implemented as one or more functions, one or more classes, or a combination of classes and functions. In the example in FIG. 4, the platform-specific renderers for each platform are grouped together into Java renderer classes 440, JavaScript renderer classes 442, ABAP renderer classes 444, and .Net renderer classes 446.

If an abstract renderer 117 and its corresponding interface 114 are defined in XML, a platform-specific renderer can be generated by an XSLT (XSL Transformations) processor for that platform. XSLT is a tool that searches for specific patterns in an XML file, and, when it finds such patterns, either modifies the patterns or takes certain prescribed actions, such as outputting a predefined pattern or a segment of predefined text. In essence, an XSLT processor transforms one language into another. The specifications for XSLT, which are set forth by the World Wide Web Consortium (W3C), can be found on W3C's web site at http://www.w3.org/Style/XSL/.

An XSLT processor can be used to transform the abstract rendering logic specified in an abstract renderer 117 into functions or classes that can be executed on a specific platform to generate code for rendering a control. In the example in FIG. 4, each interface 114 and abstract renderer 117 is processed first by a language-specific XSLT processor (e.g., Java XSLT processor 420, JavaScript XSLT processor 422, ABAP XSLT processor 424, or C# XSLT processor 426), and then by a platform-specific XSLT processor (e.g., platform-specific XSLT processor 430, 432, 434, or 436) to produce platform-specific rendering classes. The transformation of abstract rendering logic into platform-specific renderers can also be done by other tools, e.g., the Jakarta Project's Velocity tool. In an alternative implementation, a specific program can be written to perform such transformations.

Separating and abstracting rendering logic as described herein enables rendering logic to be centralized, and facilitates quick and consistent updates of user interfaces: A modification to a control can be made once in the control's abstract renderer, and the modification can be propagated automatically to multiple platforms through the automatic generation of renderers for those platforms. The description of the design for controls can thus be unified across various platforms.

Figure 5:
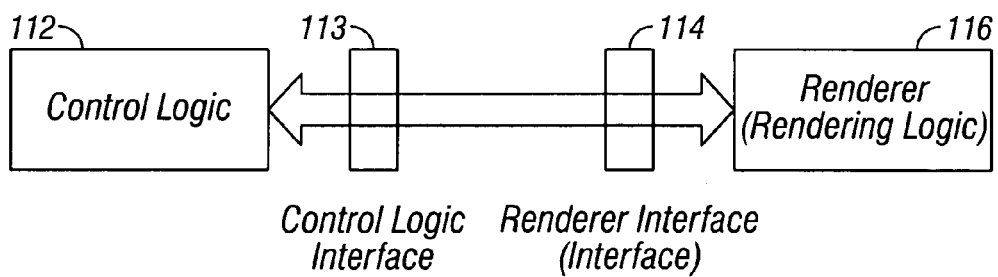
FIG. 5 is a block diagram of a renderer, a renderer interface, and a control logic interface in accordance with one embodiment of the invention.

FIG. 5 depicts an alternative implementation in which two interfaces are specified for each control—a control logic interface 113 and a renderer interface 114. As the name implies, a control logic interface 113 is an interface for a control—it specifies one or more properties that represent the state of a control and that can be used in rendering the control. An example of a control button interface 113 for a button control is shown below:

```
<control-interface name="Button"
xmlns="http://tempuri.org/control-interface.xsd">
    <property name="Design" type="ButtonDesign"
defaultValue="ButtonDesign:STANDARD"/>
    <property name="ID" type="string"
defaultValue="'MyButtonID'"/>
    <property name="Width" type="integer"
defaultValue="'200'"/>
    <property name="Tooltip" type="string"
defaultValue="'Click on this button to start.'"/>
    <property name="Text" type="string"
defaultValue="'Start'"/>
    <property name="Disabled" type="bool"
defaultValue="'false'"/>
    <enumeration name="ButtonDesign">
        <value>EMPHASIZED</value>
        <value>STANDARD</value>
        <value>SMALL</value>
        <documentation>
          This enumeration represents the 3 type of
          buttons that can be used.
        </documentation>
```

-continued

```
    </enumeration>
</control-interface>
```

In the example above, a button control has six properties: Design (an enumeration type that may have the values EMPHASIZED, STANDARD, or SMALL, which represent three possible button design types), ID (a string that represents an ID for a button), Width (an integer that represents the width of a button), Tooltip (a string that includes text to be shown when a cursor is positioned over the button), Text (a string that represents the button label), and Disabled (a Boolean that represents whether the button is active or not). The control logic 112 can set the values of these properties based on the state of a button. A control logic interface 113 can optionally provide read-only state access, meaning that a renderer can read but not set the control properties.

The renderer interface 114 in FIG. 5 is analogous to the interface 114 in FIG. 2. The renderer interface 114 specifies parameters that can be used in rendering a control. In addition, the renderer interface 114 can also specify fragments that are used to group rendering logic. An example of a renderer interface 114 for button control is shown below:

```
<renderer-interface control="Button"
xmlns:html="http://www.w3.org/1999/xhtml" skin="Design2002">
    <fragments>
        <fragment name="Button"/>
        <fragment name="ButtonFragment"/>
            parameter name="Design" type="Button:Design"
            parameter name="ID" type="string" />
            parameter name="Width" type="string" />
            parameter name="ToolTip" type="string" />
            parameter name="Text" type="string" />
            parameter name="Disabled" type="bool" />
        </fragment>
    </fragments>
</renderer-interface>
```

The renderer interface 114 above specifies an interface for a Button control that includes two fragments—a Button fragment that takes no parameters and a ButtonFragment fragment that takes six parameters of the indicated type.

The rendering logic 116 produces code for rendering a control based on the values assigned to the parameters specified in the renderer interface 114. In one implementation, the rendering logic 116 can also specify a mapping between the properties in the control logic interface 113 and the parameters in the renderer interface 114. As before, the rendering logic can be defined in an abstract renderer, an example of which is shown below:

```
<renderer control="Button"
xmlns:html="http://www.w3.org/1999/xhtml" skin="Design2002">
    <device>IE5</device>
    <fragment name="Button">
        <call-fragment name="ButtonFragment">
            <parameter name="Design"
                value="$control.Design" />
            <parameter name="ID"
                value="$control.ID" />
            <parameter name="Width"
                value="$control.Width" />
            <parameter name="ToolTip"
                value="$control.Tooltip" />
```

```
            <parameter name="Text"
                value="$control.Text" />
            <parameter name="Disabled"
                value="$control.Disabled" />
        </call-fragment>
        <fragment name="ButtonFragment">
            // ... rendering logic ...
        </fragment>
        // ... more fragments ...
    </renderer>
```

In the example above, the abstract renderer for a button control contains a first fragment (Button), which simply calls a second fragment (ButtonFragment). The Button fragment contains the mapping between the button properties specified in the control logic interface 113 and the button parameters specified in the renderer interface 114. In this example, "control" is a predefined parameter that provides access to a control's properties. Since the control in this case is a button control, the "control" parameter provides access to button properties. (As in the earlier example, a parameter is accessed by prepending its name with the "$" symbol. Thus, the notation "$control.X" can be used to access a control's properties, where X is a property specified in the control's control logic interface 113.) The example above specifies a simple mapping from six button properties to the corresponding button parameters. In general, an abstract renderer can specify a more complex mapping using expressions, branching statements, and other instructions or rendering logic. Continuing with the example above, the ButtonFragment fragment contains instructions and other rendering logic to produce code for rendering a button control based on the values of the parameters with which the fragment is called.

Figure 6:
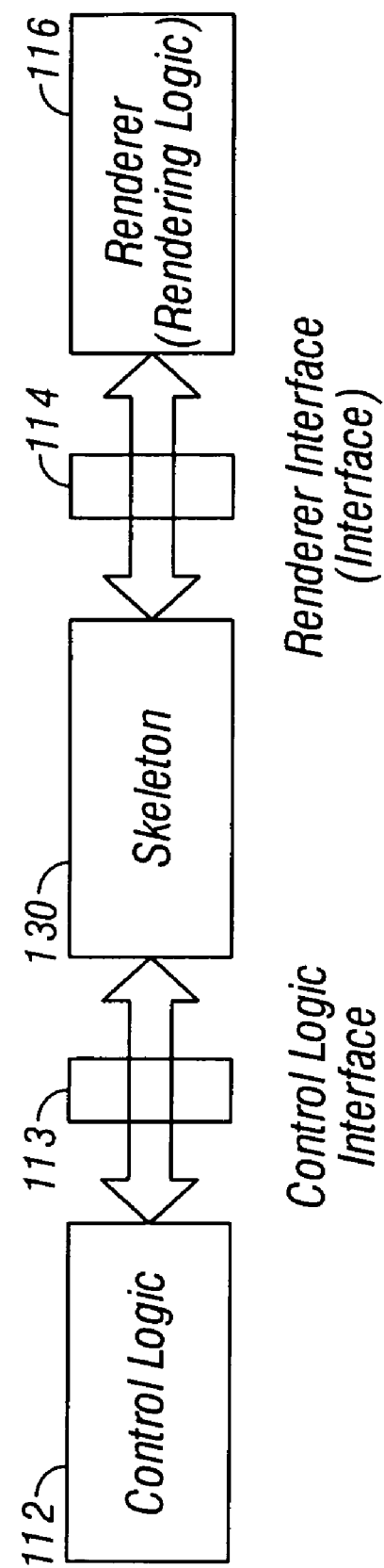
FIG. 6 is a block diagram of a renderer, a renderer interface, a skeleton, and a control logic interface in accordance with one embodiment of the invention.

FIG. 6 shows an alternative implementation in which a skeleton 130 implements the bridge between the control logic 112 and the rendering logic 116, using both the control logic interface 113 and the renderer interface 114. A skeleton 130 can provide a mapping from the properties in the control logic interface 113 to the parameters in the renderer interface 114, and invoke one or more fragments in the renderer. A skeleton 130 can thus serve as the entry point into a control's rendering logic. In the button control example specified above, a skeleton for the button control can simply include the first fragment (Button). By mapping the button properties specified in the control logic interface into the button parameters specified in the renderer interface, and invoking one or more fragments in the button rendering logic, the Button fragment serves as an entry point into the button renderer.

In one implementation, the skeletons for all controls can be implemented using a common application programming interface (API)—e.g., an API that specifies that the top-level fragment in each control is to be invoked with no parameters. The top-level fragment can then invoke one or more fragments in the control's rendering logic using the required parameters for each fragment. The skeletons can thus serve to map each control's properties into the APIs required by the control's fragments. Such an implementation can simplify the interaction between a platform framework and control renderers, since the interface through which each renderer or renderer class is accessed (e.g., the interface of the platform-dependent method into which each skeleton is transformed) can be the same for every control.

A skeleton 130 is a convenient but not a necessary component. The entry point into a control's rendering logic, as well as the mapping between the properties in the control logic interface and the renderer interface, can be provided elsewhere. For example, in the button renderer specified above, the entry point and the mapping are provided in the abstract renderer itself.

The control logic interface, renderer interface, skeleton, and abstract renderer for a control can all be processed—e.g., by an XSLT processor or another transformation process—in order to generate platform-specific code for rendering the control. In an alternative implementation, the XSLT processor (or other transformation process) generates only a platform-specific interface file from the control logic interface, and the platform-specific code for the platform-specific interface file is developed manually. That is, the XSLT processor or transformation process generates only function definitions (e.g., function names and input and output parameters), and the actual code for the functions is developed manually.

Rendering logic can include various expressions and instructions, examples of which are shown below.

```
    <call-fragment name="other-fragment"
        <parameter name="color" value="red" />
    </call-fragment>
```

Fragments can call other fragments, and can pass parameters to the called fragments. The example above generates a call to a fragment called "other-fragment," and passes the value "red" in the parameter called "color." In one implementation, fragments can access parameters by prepending parameter names with the "$" symbol. For example, the "other-fragment" fragment can access the parameter "red" through the expression "$red".

An implementation can optionally make predefined parameters available. For example, the parameter "control" (which can be accessed through the expression "$control") can be used to provide access to a control's properties, as those properties are defined in the corresponding control logic interface. As another example, the parameter "system" (which can be accessed through the expression "$system") can be used to provide access to framework services.

Rendering logic can also include statements that control the flow of execution, such as "if-then-else" statements, "switch" statements, and "for-each" statements. Examples of such statements are shown below:

```
    <if condition="$NumberOfLines != 0">
        <call-fragment name="renderTableViewPageButtons">
    <else>
        <call-fragment name="renderDisabledPageButtons">
    </if>
```

In an "if-then-else" statement, all the statements between the <if> and the <else> elements are executed if the specified condition is true; otherwise, all the statements between the <else> and the <if> elements are executed. In the example above, the fragment renderTableViewPageButtons would be called if the parameter NumberOfLines does not equal 0; otherwise, the fragment renderDisabledPageButtons would be called. The <else> statement may be optional, in which case all the statements between the <if> and the </if> elements would be executed depending on whether the specified condition is true or false.

```
<switch parameter="$Design">
    <case value="Emphasized">blue</case>
    <case value="Small">white</case>
    <default>Std</default>
</switch>
```

A "switch" statement can be used when an expression can result in one of a set of values. For each value in the set of possible values, a <case> element may define the statements to be executed when the value of the expression matches that value. The statements following the <default> element can be executed if the value of the expression does not match the value specified in any of the <case> elements. In the example above, the renderer would output the word "blue" if the parameter Design was set to the value Emphasized, the word "white" if the parameter Design was set to the value Small, and the word "Std" if the parameter Design was set to any other value. The <default> element may be optional, in which case no statement would be executed if the value of the expression does not match the value specified in any of the <case> statements.

```
<for-each select="$Links" >
    <call-fragment name="ProcessItem">
        <parameter name="Item"
            value="$Links.CurrentItem"/>
    </call-fragment>
</for-each>
```

A "for-each" statement defines a loop through an iterator object defined in a control logic interface. In one implementation, an iterator can be identified as such in the control logic interface by using the attribute "iterator" with the value "true", as in the following statement: "". The "iterator" attribute can be made optional, and the default value can be set to "false."

An iterator object is an object that can loop through a set of inner elements in a predefined sequence. The iterator object is reset when the <for-each> element is initially executed. Thereafter, all the statements until the closing </for-each> element are executed for each element of the iterator.

In the example above, the attribute "select" identifies the iterator parameter that represents the iterator object—in this case, the Links parameter. An iterator object can have various attributes. For example, in one implementation, an iterator object can include the attributes Length (which specifies the number of elements in the collection), CurrentIndex (which specifies the current index in the collection, with 0 being the first index), and CurrentItem (which specifies the current element of the iterator). Iterator attributes can be accessed by expressions such as $X.Length, $X.CurrentIndex, and $X.CurrentItem, where X is the iterator object. Thus in the example above, the ProcessItem fragment is called once with each element in the Links iterator.

In some implementations, "for-each" statements can be nested, and aliases can be used to simplify access to iterator attributes. If "for-each" statements can be nested, the iterators in the inner, nested statements may have to be different than the iterators in the outer statements. As a general rule, it may not be possible to use the same iterator in a control more than once simultaneously. This is because each use of an iterator can change the values associated with the iterator, which can interfere with a previous use of the same iterator, and cause a result such as an endless loop. Therefore, iterator objects in a control should generally be treated as single instances (i.e., objects that can only have one instantiation and use at a time).

Rendering logic can also contain statements for producing fixed code to be used in rendering a control. For example, if the code to be produced is HTML code, rendering logic can include <html> statements to produce specific HTML tags or code, as shown below:

```
<html:table cellpadding="0" cellspacing="0" border="0">
    <html:tr>
        <html:td>
            // ... statements to produce cell content
        </html:td>
        // ... statements for additional table cells
    </html:tr>
    //...statements for additional table rows
</html:table>
```

The example above might produce the following markup language:

```
<table cellpadding="0" cellspacing="0" border="0">
    <tr> <td> 11 </td> <td> 12 </td> <td> 13 </td> </tr>
    <tr> <td> 21 </td> <td> 22 </td> <td> 23 </td> </tr>
</table>
```

The <html> statements result in the production of HTML code, such as the HTML code shown above that draws a table with two rows and three cells in each row. (The rendering logic presumably also contains code to produce the content of the table cells, such as the integers shown in the example above.)

Rendering logic can also contain statements to set attributes and sub-attributes in the output rendering code. In one implementation, <attribute> statements are used to extend <html> statements, as shown below:

```
<html:a href="#">
    <attribute name="title" value="$ToolTip" />
    // . . . additional HTML code to be produced
</html:a>
```

In the example above, the <attribute> statement extends the enclosing <html> statement with the attribute specified by "name" and the value specified by "value." Assuming the parameter ToolTip has the value "This is a tool tip", the above statements could result in the production of the following HTML code:

<a href="#" title="This is a tool tip"> . . . </a>

Code outside of statements or tags can be treated as content to be produced as part of the output markup code, as shown below:

```
<html:a href="#">
    <attribute name="class">linkhover
        <switch parameter="$Design">
            <case value="Emphasized">blue</case>
            <case value="Small">white</case>
            <default></default>
        </switch>
    </attribute>
    <html:nobr>
        <value value="$Text"/>
    </html:nobr>
</html:a>
```

Assuming that the value of the Design parameter is Emphasized, and that the value of the Text parameter is "This is a link", the above statements can result in the production of the following HTML code:

```
<a href="#" class="linkhoverblue" <nobr>This is a link</nobr></a>
```

Some attributes (e.g., the HTML "style" attribute) may contain a list of sub-attributes. A <collector> statement can be used to store sub-attributes within a parent attribute. At runtime, the <collector> statement injects the proper attributes and sub-attributes within the encapsulating tag or rendering code. An example of the <collector> statement is shown below:

```
<html:p>
    <collector attribute="style" name="color" value="$ColorValue"/>
    <collector attribute="style" name="font" value="arial"/>
    <collector attribute="style" name="align"/>
    <switch parameter="$Alignment">
        <case value="LeftAligned">left</case>
        <case value="RightAligned">right</case>
        <default>left</default>
    </switch>
    $Text
</html:p>
```

Assuming that the value of the ColorValue parameter is "green", the value of the Alignment parameter is LeftAligned, and the value of the Text parameter is "This is some text in a paragraph", the above statements can result in the production of the following HTML code:

```
<p style="color:green font:arial align=left">This is some text in a paragraph</p>
```

Rendering logic can specify expressions, which can include parameters and constants combined with operators and parentheses. One implementation includes the operators shown in Table 1 below.

TABLE 1

| Operator | Operation |
|---|---|
| and | logical and |
| or | logical or |

TABLE 1-continued

| Operator | Operation |
|---|---|
| not (or "!") | negation |
| eq (or "=") | equality |
| ne (or "!=") | not equal |
| lt | less than |
| le | less than or equal to |
| gt | greater than |
| ge | greater than or equal to |
| ( ) | grouping |
| + | addition or string concatenation |
| − | subtraction |
| div | floating point division |
| * | multiplication |
| mod | remainder from a truncating division |

Some examples of expressions using the above operators are shown below:

```
<if condition="$Design = Emphasized">
<if condition="$Design eq Emphasized">
<if condition="($Design != Emphasized) and ($HeaderDesign = Standard)">
<if condition="($RowCount+1) le ($ColCount+5)">
<if condition="($Row.Index mod 2) = 0">
<attribute name="id" value="$Name + '_someLiteral_' + $CurrentIndex"/>
```

The first two statements in the example above check whether the value of the parameter Design equals the value Emphasized. The third statement checks a whether the parameter Design does not equal the value Emphasized and the parameter HeaderDesign equals the value Standard. The compound expression will evaluate to true (and the statements inside the <if> statement will be executed) if and only if both conditions apply (i.e., if Design is not set to Emphasized and HeaderDesign is set to Standard). The fourth statement is an example of a compound expression that uses parameters, constants, a mathematical operator (e.g., the "+" operator), and parentheses to group sub-expressions. The fifth statement is an example of an expression that can be used to determine if the current row being rendered is an even row. This can be useful, for example, if odd rows and even rows in a table are to be rendered in different colors. Finally, the last statement is an example of use of the "+" operator to concatenate strings.

Rendering logic can also include a <render> statement, which is a call to the framework to render either another control or another collection of controls. An example of a <render> statement is shown below:

```
<for-each select="$control.children">
    <render content="$control.children.currentItem">
</for-each>
```

The parameter that is assigned to the "content" attribute in the <render> statement represents the control or group of controls to be rendered. The example above is a simple loop that cycles through and renders each of the current control's children. For example, if the current control is a toolbar that has a number of children controls such as buttons and drop-down boxes, the above loop may be used to generate rendering code for all such children controls. If one of the children is itself a grouping of additional controls, that child may invoke a <render> statement to generate rendering code for its own children controls. Rendering may thus be recursive, since a call to the framework to render a control can result in another call to the framework to render a control. The recursion ends when the framework is called with a control that does not have any children controls.

The rendering logic specified above may be extended to provide additional functionality. For example, rendering logic may be extended to interact with and to take advantage of client-side framework functionality. A client-side framework (CSF) may be implemented on a client computer 150. The CSF may provide rendering functionality on the client computer 150—e.g., the CSF may be able to produce some of the code to be used in rendering pages, including pages sent from an application server. The CSF may also enable dynamic web pages that allow data to be manipulated without redrawing an entire page.

As an example, rendering logic can be extended to specify how client-side events (e.g., HTML Document Object Model (DOM) events) should be handled. In one implementation, rendering logic can specify CSF event-handling routines to handle specific HTML DOM events. In such an implementation, a renderer interface can be extended with <event> statements as follows:

```
<renderer-interface control="Button"
    xmlns:html="http://www.w3.org/1999/xhtml" skin="Design2002">
    // fragment definitions
    <events>
        <event type="ClickEvent" scope="all">
            <parameter name="ControlID" type="string"/>
        </event>
        <event type="SetFocusEvent"
defaultscope="Invisible">
            <scope name="CSF" value="visible"/>
            <parameter name="ControlID" type="string"/>
        </event>
        <event type="KillFocusEvent"
defaultscope="Invisible">
            <scope name="CSF" value="visible"/>
            <parameter name="ControlID" type="string"/>
        </event>
    </events>
</renderer-interface>
```

The sample renderer interface above specifies that a Button control should respond to three event types—ClickEvent, SetFocusEvent, and KillFocusEvent. The Button control's abstract renderer can then include the code shown below:

```
<renderer control="Button"
    xmlns:html="http://www.w3.org/1999/xhtml" skin="Design2002">
    <device>IE5</device>
    <fragment name="Button">
        // rendering logic
        <event name="onClick" mappedTo="ClickEvent">
            <parameter name="ControlID" value="$ID"/>
        </event>
        <event name="onFocus" mappedTo="SetFocusEvent">
            <parameter name="ControlID" value="$ID"/>
        </event>
        <event name="onBlur" mappedTo="KillFocusEvent">
            <parameter name="ControlID" value="$ID"/>
        </event>
        // more rendering logic
```

```
    </fragment>
    // more fragments
</renderer>
```

The <event> statements above map HTML DOM events to the event types specified in the renderer interface, and indicate that when a specific HTML DOM event is intercepted, the JavaScript routine that is able to handle the corresponding event should be invoked. For example, when the HTML DOM event onClick occurs, the client-side event handling routine of type ClickEvent should be called with one parameter. The value of the parameter at runtime is the value of the ControlID parameter of the Button fragment. The name of the JavaScript function that may actually be called at runtime can be derived from naming conventions and from the generation tool set that is in use. For example, the HTML code produced by the renderer above may look as follows (assuming that the rendering logic before and after the <event> statements produces the appropriate table-related rendering code):

```
<table cellpadding="0" cellspacing="0" border="0"
    style="width:25px">
    <tr>
        <td class="sapBtnStd"
onClick="javascript:CSF_ButtonClickEvent('ShowDetail')"
onFocus="javascript:CSF_ButtonSetFocus('ShowDetail')"
onBlur="javascript:CSF_ButtonKillFocus('ShowDetail')">
            <nobr>Click Me</nobr>
        </td>
    </tr>
</table>
```

Rendering logic can also be extended to include a specification of one or more functions that can be invoked directly on the client side. When a server replies to a client request, the server typically returns an entire page to be rendered. In contrast to this standard protocol, a client side framework (CSF) can optionally allow the server to transmit only the modified data on a page, which greatly reduces the required bandwidth between the server and the client. As a further optimization, the CSF may in some instances avoid re-rendering altogether. For example, when a button is deactivated, the CSF may simply manipulate DOM attributes to reflect the disabling of the button rather than re-rendering the button. Thus, if a button is contained in an HTML table element that is part of an HTML DOM tree, the CSF may simply change the class attribute of the corresponding <tr> object from, e.g., sapBtnStd to sapBtnDsbl, and deactivate the event handler.

In order to maintain the distinction between the control logic and the rendering logic, the control logic should invoke a function (e.g., a JavaScript function) on the client side, rather than manipulate the HTML DOM tree directly. This can be accomplished through the use of a <modificationAPI> element in a renderer interface, as shown below:

```
<renderer-interface control="Button"
    xmlns:html="http://www.w3.org/1999/xhtml" skin="Design2002">
    // fragment definitions
    // event definitions
    <modificationAPI>
```

-continued

```
        <function name="Button_Disable"/>
        <function name="Button_Enable"/>
        <function name="Button_changeCaption">
            <parameter name="caption" type="string"/>
        </function>
    </modificationAPI>
</renderer-interface>
```

The above interface identifies three JavaScript functions that the control logic can invoke in order to perform client-side modifications: Button_Disable, Button_Enable, and Button_changeCaption. The last function takes one parameter, caption. The functions can be implemented in a JavaScript file (e.g., "./button.js"), and bound to a renderer through the "javascript" attribute, which is an optional part of the <render> element. An example of this is shown below:

```
        <renderer control="Button"
    xmlns:html="http://www.w3.org/1999/xhtml" skin="Design2002"
    javascript="./button.js">
```

The example in FIG. 3 shows an abstract renderer 117 for a control, and one platform-specific renderer 116a, 116b, 116c generated from the abstract renderer 117 for each platform 100a, 100b, 100c. However, for each control, multiple platform-specific renderers may be generated for each platform.

A control may need to be rendered on multiple devices. A device is a version of a client program that can be used to render an application interface. The client program may be, for example, a browser such as a web browser. Each version of a particular web browser—e.g., Internet Explorer 5.0, Internet Explorer 5.5, Netscape Navigator 4.0, and Netscape Navigator 6.0—may be considered a distinct device. Client programs are not limited to web browsers, however. For example, a client program, which can generally be any GUI engine, may be a graphical user interface such as an X Windows interface or a Microsoft Windows interface (e.g., an SVG- or WinForms-based interface). In such a case, a generated renderer can generate code, including control or drawing commands or methods, that can be used to render controls in the X Windows interface or in the Microsoft Windows interface. A client program can also be a mobile client interface, such as a Wireless Markup Language (WML) interface. Each version of these interfaces may be considered a distinct device. For each control, a platform-specific renderer can be generated for each device. The rendering code generated by a platform-specific renderer for one device can be different from the rendering code generated by a platform-specific renderer for a different device.

In general, then, there may be as many platform-specific renderers generated for each control as there are devices. For example, if there are two platforms (e.g., Java and .Net) and four devices (e.g., two versions of Internet Explorer and two versions of Netscape Navigator), a total of 4*2 or 8 renderers may be generated for each control. Thus, a button control may require four Java button renderers (one for each device), and four .Net button renderers (again, one for each device).

The framework 110 provided on a specific platform may contain a mapping of a control's class to possible platform-specific renderers (e.g., to possible functions or classes that can produce code for rendering the control). At runtime, the framework must find the proper renderer (e.g., function or class) to use for rendering the control on the device currently in use at the client computer 150. To accomplish this, the framework can match information from the renderers against information from the current device.

A renderer can be identified as suitable for a particular device by a <device> statement, as shown in the example below:

```
    <renderer control="Button">
        // This is the default renderer for the Mozilla 4.0
        // compatible family. It is known to work with MSIE
        // on Windows NT, and it is the definitive renderer for
        // IE 5.5 on Win2K
        <device>Mozilla/4.0 (compatible; *)</device>
        <device>Mozilla/4.0 (compatible; MSIE *; Windows NT
*) </device>
        <device>Mozilla/4.0 (compatible; MSIE 5.5; Windows NT
5.0) </device>
        //fragments
    </renderer>
```

Other types of <device> statements may be, for example:

```
    <device>PPC</device> // renderer for Pocket PC
    <device>Palm</device> // renderer for Palm OS
    <device>WAP</device> // renderer for Wireless Access
Protocol clients
```

A framework 110 can determine the appropriate renderer to use by obtaining information from a device and matching such information against information in a renderer's <device> element. For example, the framework 110 can obtain a device's User-Agent string as specified in the HTTP protocol, and select a renderer that either matches that string exactly or that has the closest match to that string. The framework 100 can optionally obtain additional information about the current device from the client-side framework or from an object that describes a client's capabilities, and can use such information in determining which renderer to use.

Figure 7:
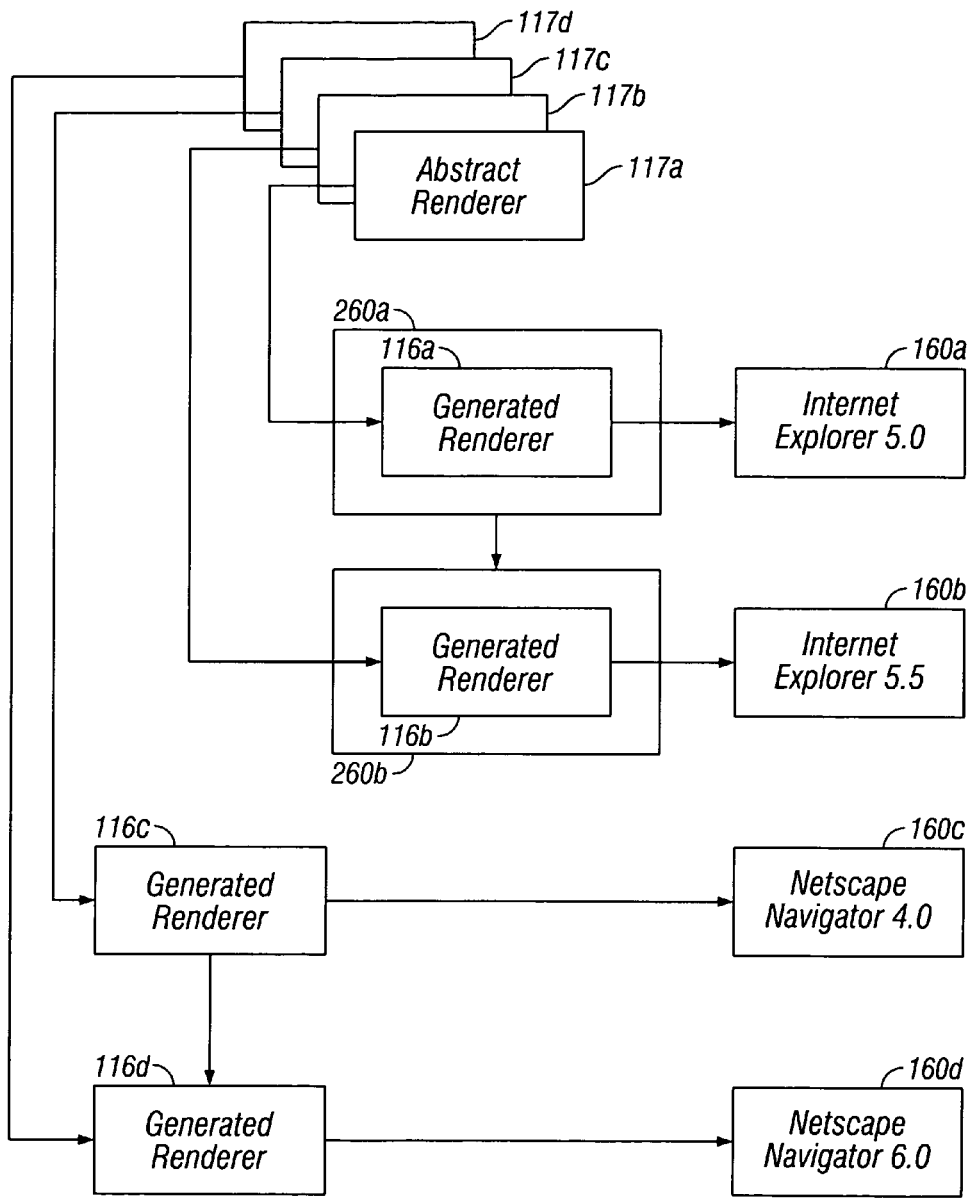
FIG. 7 is a block diagram of an abstract renderer and four platform-specific renderers in accordance with one embodiment of the invention.

FIG. 7 shows four abstract renderers 117a, 117b, 117c, 117d for a control, and four devices 160a, 160b, 160c and 160d on which the controls are to be rendered. Each abstract renderer specifies how the control should be rendered on one of the devices. The abstract renderers 117a, 117b, 117c, 117d are used to generate platform-specific renderers 116a, 116b116c and 116d for the control. The platform-specific renderers 116a, 116b, 116c, 116d may all be for the same platform (e.g., a Java platform).

If a generated renderer is included in a class library for a specific device, the generated renderer for a subsequent version of the device may be included in a child class library that inherits some of the properties of the first, parent class library. In the example shown in FIG. 7, the generated renderer 116a is in a class library 260a with renderer code for the device Internet Explorer 5.0 160a, and the generated renderer 116b is in a class library 260b with renderer code for the device Internet Explorer 5.5 160b. The class library 260b for the device Internet Explorer 5.5 160b is hierarchically arranged as a child of the class library 260a for the device Internet Explorer 5.0 160a, so that class library 260b can inherit some of the properties of the class library 260a, including possibly some of the methods in the generated renderer 116a. The class library 260b can then specify modifications or additions for rendering the control on the device Internet Explorer 5.5 160*b*.

A packaging file (similar to a makefile) can be used to specify the relationship between class libraries. An example of such a packaging file is shown below:

```
<package for="IE5.5"
  <button source="IE5.0">
  <group source="IE5.0"/>
  <tabstrip/>
  // additional controls
</package>
```

The example above states that the rendering class library for Internet Explorer 5.5 should use the button renderer and the group renderer from the class library for Internet Explorer 5.0, and its own tabstrip renderer (i.e., the tabstrip renderer for Internet Explorer 5.5). Such an arrangement can be effected by linking to the button and group rendering functions in the rendering class for Internet Explorer 5.0, or by copying those rendering functions into the rendering class for Internet Explorer 5.5.

The above example describes how the renderer for an entire control can be reused, but rendering logic can also be reused at the fragment level. An example of reuse of fragments is shown below:

```
<renderer name="Group" device="IE5.5" useDevice="IE5.0">
  <fragment name="groupBody"
  // ... rendering logic for groupBody fragment ...
  </fragment>
</renderer>
```

The above example specifies that the renderer for the Group control for Internet Explorer 5.5 should use all the fragments in the renderer for the Group control for Internet Explorer 5.0, with the exception of the groupBody fragment, which is specifically provided in the renderer for Internet Explorer 5.5.

Figure 8:
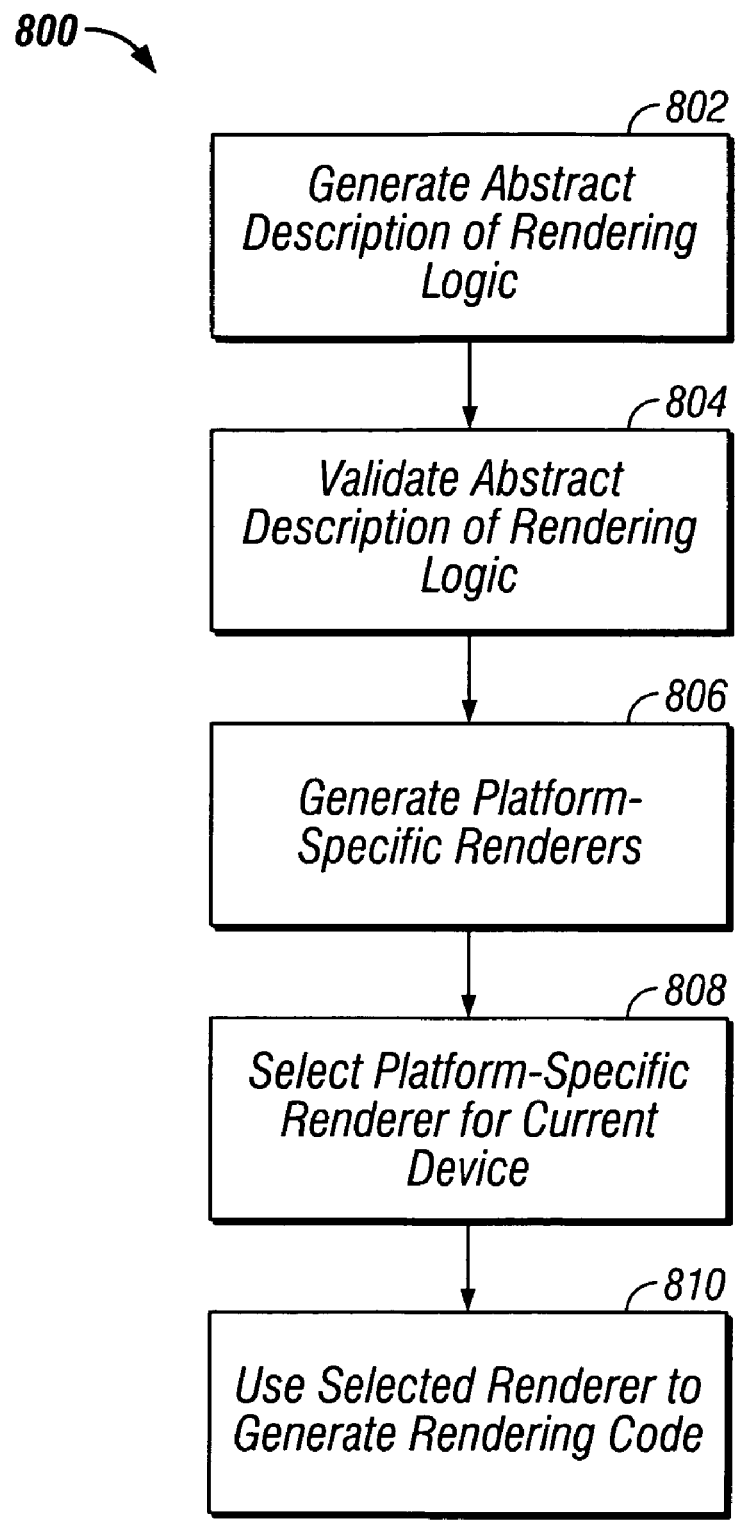
FIG. 8 is a flowchart of a process in accordance with one embodiment of the invention.

FIG. 8 is a flowchart of a process 800 for generating and using platform-specific renderers. First, an abstract description of the rendering logic for a control is generated (802). Next, the abstract description is validated (804). For example, if the abstract description is written in XML, it can be validated against a DTD to ensure that the description is complete and syntactically and grammatically correct.

Next, one or more platform-specific renderers are generated for the control (806). As described above, a renderer can be generated for each platform on which an application runs and for each device which can possibly be used to access the application. If the abstract description is written in XML, this step can be performed by an XSLT processor.

The final two steps occur at runtime (i.e., when an application is executing on a particular platform and framework). The application can receive a request from a client device that alters the state of the control. If the altered state of the control requires the control to be re-rendered, the framework selects an appropriate platform-specific renderer based on information about the client device (808). The platform-specific renderer then generates code to be used in rendering the control based on the new state of the control (810). The generated code can then be sent to the client and rendered on the client device.

The invention disclosed herein can be enhanced in various ways. For example, in one implementation, the rendering logic can include documentation statements that can be used to generate automatic documentation for control interfaces, renderer interfaces, and renderers and renderer fragments.

In some implementations, the abstract renderer for each control is required to be coded as a tree with only one root. For example, each abstract renderer can be coded as a single-rooted HTML subtree, so that each control can be represented by a single HTML DOM node (i.e., so that a single HTML DOM node is the root of each control's renderer). This can be necessary in certain situations. For example, a client-side framework may be able to handle the dynamic creation and insertion of controls into a browser's HTML DOM tree, but only if the controls are represented as single-rooted HTML DOM objects.

Single-rooted control rendering can also be advantageous in implementations where attributes can be automatically inserted into controls. For example, attributes that determine the visibility of controls can be automatically inserted into the code for rendering the controls rather than coded as part of the abstract renderers. The automatic insertion of such attributes into controls is simplified if the controls are single-rooted.

The invention can be used for all types of rendering, including graphical-based rendering, and text- or web-based rendering. In general, an abstract renderer can be used to generate a renderer that produces rendering code for any type of GUI engine. For example, a generated renderer can produce markup code (e.g., HTML, XML, WML, or code in another SGML-based markup language) to be interpreted and rendered by an application (e.g., a browser or a browser plug-in) or by a graphics system (e.g., a graphics card, or the graphical subsystem of the operating system) on the client computer. Alternatively, a generated renderer can produce control or drawing commands, or control or drawing methods or functions, to be executed on the client computer (e.g., by an application or by a graphics system on the client computer). Rendering code can also constitute a combination of markup code, commands, and functions to be interpreted, rendered, or executed on a client computer.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method acts of the invention can be performed by one or more programmable processors executing a computer program to perform functions of the invention by operating on input data and generating output. Method acts can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention has been described in terms of particular embodiments. Other embodiments are within the scope of the following claims. For example, the steps of the invention can be performed in a different order and still achieve desirable results.

What is claimed is:

1. A system, comprising:
   a processor executing applications on at least one of a plurality of platforms;
   a component for generating a platform-independent description of rendering logic for a control; and
   a component for automatically generating, based on the description, a platform-specific renderer for generating the control, the platform-specific renderer being operable to be executed on the at least one of the plurality of platforms.

2. The system of claim 1 wherein the platform-independent description comprises an interface for the control.

3. The system of claim 2 wherein the interface comprises a parameter, and wherein the platform-independent description is based on the parameter.

4. The system of claim 3 wherein the platform-independent further description comprises:
   a comparison of the parameter and a value; and
   a branching instruction that is based on the result of the comparison.

5. The system of claim 4 wherein the comparison and the branching instruction comprise a loop.

6. The system of claim 3 wherein the platform-independent description further comprises:
   a logical expression that is a function of the parameter; and
   a branching instruction that is based on the result of the logical expression.

7. The system of claim 3 wherein the platform-specific renderer is operable to produce code to be used in rendering the control, and wherein the platform-independent description further comprises an attribute that is to be included in the code.

8. The system of claim 7 wherein the attribute is fixed.

9. The system of claim 7 wherein the platform-independent description further comprises a mapping from the parameter to the attribute.

10. The system of claim 3 wherein the platform-independent description further comprises a control logic interface for the control, the control logic interface comprising a property that represents the state of the control.

11. The system of claim 10 wherein the platform-independent description further comprises a mapping from the property to the parameter.

12. The system of claim 2 wherein the platform-specific renderer is operable to produce code to be used in rendering the control on a client computer, and wherein the interface comprises an indication of a function that can be executed on the client computer.

13. The system of claim 12 wherein the function is a JavaScript function.

14. The system of claim 1 wherein the platform-specific renderer is operable to produce code to be used in rendering the control.

15. The system of claim 14 wherein the code comprises a command.

16. The system of claim 14 wherein the code comprises a method.

17. The system of claim 14 wherein the code comprises markup code.

18. The system of claim 17 wherein the markup code comprises statements in an SGML-based markup language.

19. The system of claim 17 wherein the platform-independent description comprises a tag to be included in the markup code.

20. The system of claim 19 wherein the markup code comprises HTML code, and wherein the tag is an HTML tag.

21. The system of claim 19 wherein the markup code comprises XML code, and wherein the tag is an XML tag.

22. The system of claim 19 wherein the markup code comprises WML code, and wherein the tag is a WML tag.

23. The system of claim 19 wherein the markup code comprises SVG code, and wherein the tag is an SVG tag.

24. The system of claim 1, wherein the platform-specific renderer is operable to produce code to be used by a GUI engine in rendering the control.

25. The system of claim 24 wherein the GUI engine is web-based.

26. The system of claim 24 wherein the GUI engine is based on an operating system.

27. The system of claim 24 wherein the GUI engine comprises an application.

28. The system of claim 27 wherein the application is a browser.

29. The system of claim 24 wherein the GUI engine comprises an SVG engine.

30. The system of claim 24 wherein the GUI engine comprises a graphical subsystem of an operating system.

31. The system of claim 24 wherein the GUI engine comprises a graphics card.

32. The system of claim 1 wherein the platform-independent description comprises a named event and an indication of a function to be invoked when the named event occurs.

33. The system of claim 32 wherein the function indication comprises a function type.

34. The system of claim 1 wherein the platform-specific renderer is operable to produce code to be used by a program on a client computer, and wherein the platform-independent description comprises an indication of a client program for which the code is suitable.

35. The system of claim 34 wherein the indication of the client program comprises a version number of the client program.

36. The system of claim 1 wherein the platform-independent description is specified in a meta-language.

37. The system of claim 36 wherein the meta-language has validation capabilities.

38. The system of claim 37 wherein the meta-language is XML.

39. The system of claim 1 wherein the platform-specific renderer comprises a function.

40. The system of claim 1 wherein the platform-specific renderer comprises a class library.

41. The system of claim 1 wherein the platform-independent description comprises a first fragment of rendering logic and a second fragment of rendering logic.

42. The system of claim 41 wherein the first fragment comprises an instruction that calls the second fragment.

43. The system of claim 41 wherein the second fragment is nested within the first fragment.

44. A system comprising:
a platform;
a first storage component storing a first platform-independent description of rendering logic for a control, the first platform-independent description comprising a fragment of rendering logic;
a second storage component storing a second platform-independent description of rendering logic for the control, the second platform-independent description comprising an indication to use the fragment of rendering logic from the first platform-independent description;
a first platform-dependent renderer for the control, wherein the first platform-dependent renderer is operable to be executed on the platform and is generated automatically based on the first platform-independent description; and
a second platform-dependent renderer for the control, wherein the second platform-dependent renderer is operable to be executed on the platform and is generated automatically based on the fragment and the second platform-independent description.

45. A system comprising:
a platform;
a storage component storing a platform-independent description of rendering logic for a control;
a platform-specific renderer for the control, wherein the platform-specific renderer is operable to be executed on the platform and is generated automatically based on the platform-independent description;
a first class library operable to produce code for rendering a set of controls on a first device, the first class library comprising the platform-specific renderer; and
a second class library operable to produce code for rendering the set of controls on a second device, wherein the second device has substantially all the features of the first device, and wherein the second class library is hierarchically arranged to inherit properties of the first class library.

46. The system of claim 45 wherein the second class library comprises a link to the platform-specific renderer in the first class library.

47. The system of claim 45 wherein the second class library comprises a copy of the platform-specific renderer in the first class library.

48. A system comprising:
a plurality of platforms;
an apparatus for generating a plurality of platform-independent descriptions of rendering logic for a control, each platform-independent description stored on a storage component and corresponding to a device on which the control is to be rendered; and
a plurality of platform-specific renderers for the control, wherein each platform-specific renderer is generated automatically based on one of the plurality of platform-independent descriptions and is operable to be executed on one of the plurality of platforms to produce code for rendering the control on the device that corresponds to the platform-independent description on which the platform-specific renderer is based.

49. A method comprising:
generating a platform-independent description of rendering logic for a control; and
generating a first platform-specific renderer for the control based on the platform-independent description, the first platform-specific renderer being operable to be executed on a first platform of a first type to produce code that can be used in rendering the control.

50. The method of claim 49 further comprising:
generating a second platform-specific renderer for the control based on the platform-independent description, the second platform-specific renderer being operable to be executed on a second platform of a distinct, second type to produce code that can be used in rendering the control.

51. The method of claim 49 wherein the platform-independent description comprises an XML file.

52. The method of claim 51 wherein an XSLT processor is used to generate the first platform-specific renderer.

53. The method of claim 49 wherein the first platform-specific renderer comprises a function.

54. The method of claim 49 wherein the first platform-specific renderer comprises a class library.

55. A method comprising:
receiving at least one platform-independent description of rendering logic for a control;
generating at least two platform-specific renderers for the control based on the at least one platform-independent description, each platform-specific renderer being operable to be executed on a particular platform to produce code that can be used in rendering the control;
receiving information about a device on which the control is to be rendered; and
selecting one of the platform-specific renderers to produce code to be used in rendering the control based on the information about the device.

56. The method of claim 55 wherein the information about the device comprises an HTTP user-agent string.

57. A method comprising:
receiving a first platform-independent description of rendering logic for a control, wherein the first platform-independent description corresponds to a first device on which the control is to be rendered, and comprises a fragment;
receiving a second platform-independent description of rendering logic for the control, wherein the second platform-independent description corresponds to a second device on which the control is to be rendered, and comprises an indication to use the fragment from the first platform-independent description;
generating a first platform-specific renderer for the control based on the first platform-independent description, the first platform-specific renderer being operable to be executed on a platform to produce code that can be used in rendering the control on the first device; and
generating a second platform-specific renderer for the control based on the fragment and the second platform-independent description, the second platform-specific renderer being operable to be executed on the platform to produce code that can be used in rendering the control on the second device.

58. A method comprising:
receiving a platform-independent description of rendering logic for a control, the platform-independent description corresponding to a first device on which the control is to be rendered;
generating a platform-specific renderer for the control based on the platform-independent description;
generating a first class library for rendering a set of controls on the first device, the first class library comprising the platform-specific renderer; and
generating a second class library for rendering the set of controls on a second device, the second class library comprising a link to the platform-specific renderer in the first class library.

59. The method of claim 58 wherein the link arises by virtue of a hierarchical relationship between the first class library and the second class library.

60. A computer program product, stored on a machine storage medium, comprising instructions operable to cause a programmable processor to:
generate a platform-independent description of rendering logic for a control; and
generate a first platform-specific renderer for the control based on the platform-independent description, the first platform-specific renderer being operable to be executed on a platform of a first kind to produce code that can be used in rendering the control.

61. The computer program product of claim 60 wherein the instructions are further operable to cause the programmable processor to:
generate a second platform-specific renderer for the control based on the platform-independent description, the second platform-specific renderer being operable to be executed on a platform of a distinct, second kind to produce code that can be used in rendering the control.

62. A computer storage template for generating a platform-specific renderer for a control, the template comprising:
an interface for a control, the interface comprising a parameter; and
rendering logic that specifies, based on a platform-independent description, code to be used in rendering the control, wherein the code is based on the parameter.

63. The computer storage template of claim 62 wherein the rendering logic is automatically transformable into platform-specific logic that can be executed on a specific platform to produce the code.

64. The computer storage template of claim 62 further comprising a control logic interface for the control, the control logic interface comprising a property that represents the state of the control.

65. The computer storage template of claim 64 wherein the rendering logic comprises a mapping from the property to the parameter.

66. The computer storage template of claim 62 wherein the rendering logic comprises a first fragment and a second fragment.

67. The computer storage template of claim 62 wherein the template is specified in a meta-language.

68. The computer storage template of claim 67 wherein the meta-language is XML.

69. The computer storage template of claim 62 wherein the code comprises a command.

70. The computer storage template of claim 62 wherein the code comprises a method.

71. The computer storage template of claim 62 wherein the code comprises markup code.

72. The computer storage template of claim 71 wherein the markup code comprises statements in an SGML-based markup language.

73. The computer storage template of claim 72 wherein the SGML-based markup language is HTML.

74. The computer storage template of claim 72 wherein the SGML-based markup language is SVG.

75. The computer storage template of claim 62 wherein the code is to be used as input to a GUI engine.

76. The computer storage template of claim 75 wherein the GUI engine comprises a browser.

77. The computer storage template of claim 75 wherein the GUI engine comprises an SVG engine.

78. The computer storage template of claim 75 wherein the GUI engine comprises a graphical subsystem of an operating system.

* * * * *